United States Patent
Takita et al.

(10) Patent No.: US 9,077,480 B2
(45) Date of Patent: Jul. 7, 2015

(54) DEMAND ACCOMMODATION DESIGNING SYSTEM AND METHOD

(75) Inventors: Yutaka Takita, Kawasaki (JP); Kazuyuki Tajima, Kawasaki (JP); Tomohiro Hashiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 515 days.

(21) Appl. No.: 13/598,949

(22) Filed: Aug. 30, 2012

(65) Prior Publication Data
US 2013/0101286 A1 Apr. 25, 2013

(30) Foreign Application Priority Data
Oct. 21, 2011 (JP) ................................. 2011-232251

(51) Int. Cl.
| | | |
|---|---|---|
| H04J 4/00 | (2006.01) | |
| H04J 14/02 | (2006.01) | |
| H04L 12/729 | (2013.01) | |
| H04L 12/721 | (2013.01) | |
| H04B 10/00 | (2013.01) | |

(52) U.S. Cl.
CPC ..... *H04J 14/0256* (2013.01); *H04J 2203/0067* (2013.01); *H04L 45/125* (2013.01); *H04L 45/62* (2013.01); *H04J 14/0257* (2013.01); *H04J 14/0267* (2013.01); *H04J 14/0271* (2013.01); *H04J 14/0284* (2013.01)

(58) Field of Classification Search
CPC .............. H04J 14/0256; H04J 14/0257; H04J 14/0267; H04J 14/0271
See application file for complete search history.

(56) References Cited

U.S. PATENT DOCUMENTS

| | | | |
|---|---|---|---|
| 6,404,744 B1 * | 6/2002 | Saito | 370/255 |
| 2003/0161633 A1 | 8/2003 | Oki et al. | |
| 2011/0205901 A1 * | 8/2011 | Imai | 370/238 |

FOREIGN PATENT DOCUMENTS

| | | |
|---|---|---|
| JP | 11-215124 | 8/1999 |
| JP | 2003-258886 | 9/2003 |
| JP | 2004-080666 | 3/2004 |
| JP | 2007-311900 | 11/2007 |

OTHER PUBLICATIONS

JPOA—Office Action mailed on Mar. 31, 2015 issued with respect to the Japanese Patent Application No. 2011-232251, with partial English translation.

* cited by examiner

*Primary Examiner* — Daniel Dobson
(74) *Attorney, Agent, or Firm* — Fujitsu Patent Center

(57) ABSTRACT

A demand accommodation design system for accommodating a demand specifying a signal transmission route from a start-point node to an end-point node within an optical network includes an analytical unit to acquire at least one optical path candidate for minimizing cost of the optical network by solving an objective function incorporating cost of optical path candidates by bandwidth, the optical path candidate being a candidate for an optical path composing a demand, and a mathematical programming problem employing a constraint condition incorporating a bandwidth of an optical path pattern candidate connecting the start-point node and the end-point node of the demand and a bandwidth of the acquired optical path candidate, the optical path pattern candidate being the acquired optical path candidate itself or being obtained by combining the optical path candidates, and an allocation unit to allocate the demand to the acquired optical path candidate to accommodate the demand.

20 Claims, 13 Drawing Sheets

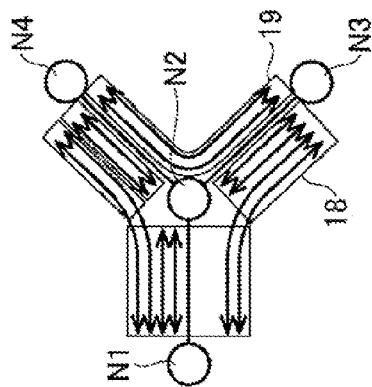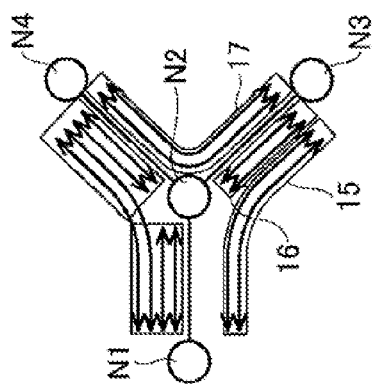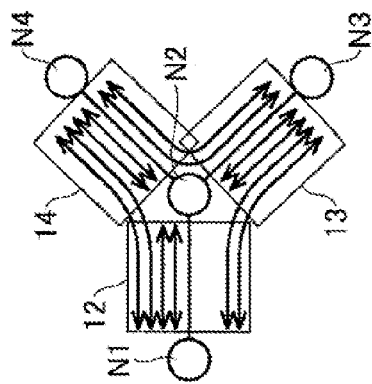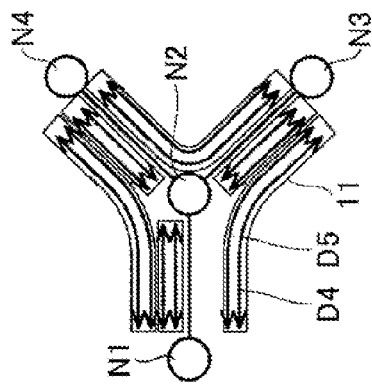

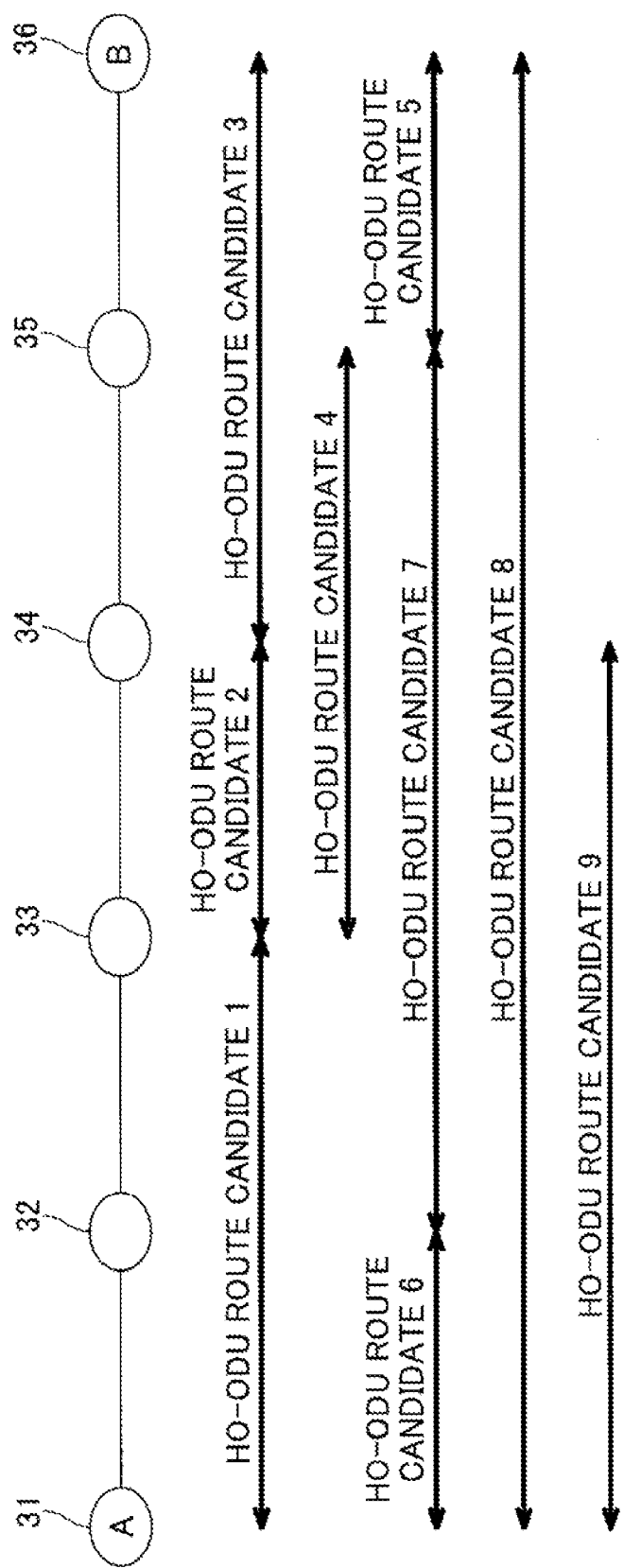

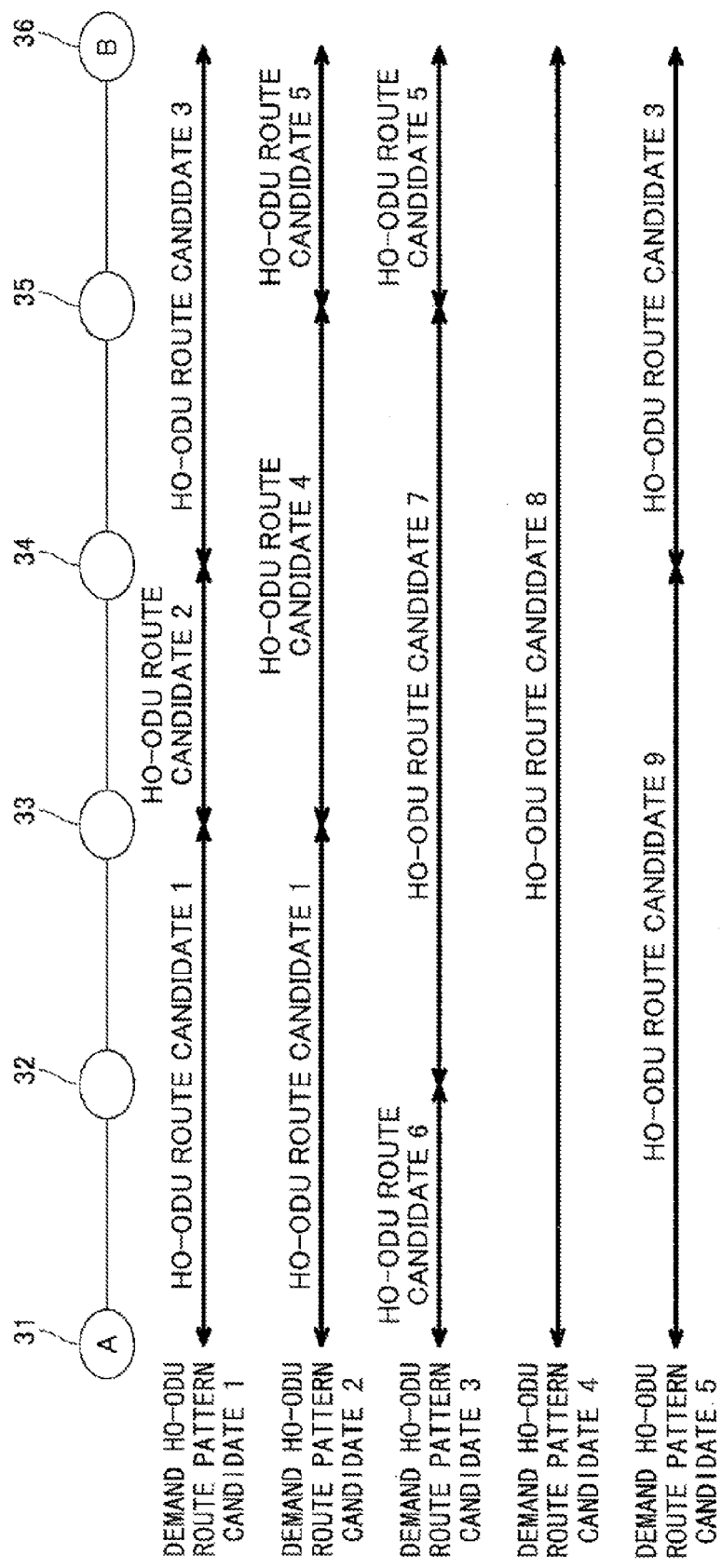

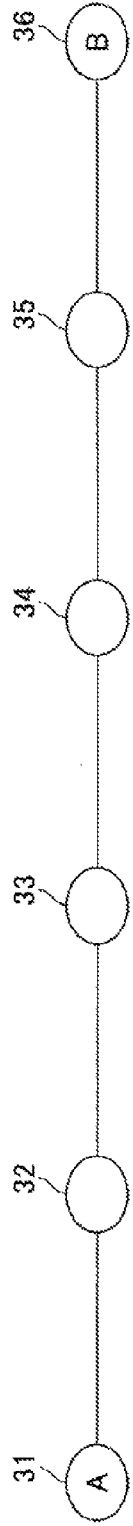
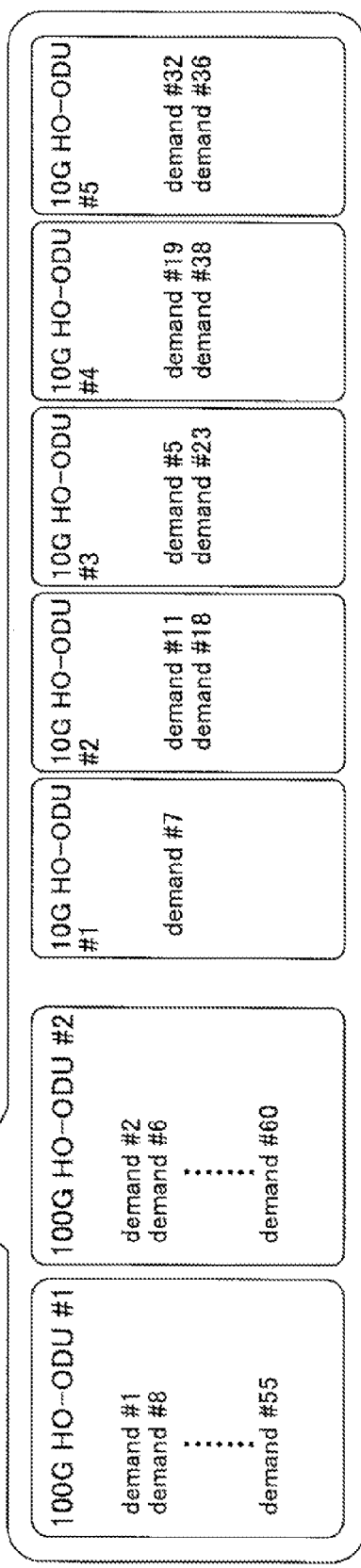
FIG.7

FIG.9

| Name | Type | Description |
|---|---|---|
| t | (Object) | DEMAND HO-ODU ROUTE PATTERN |
| h | (Object) | HO-ODU ROUTE |
| s | (Object) | LINKS WITHIN NETWORK |
| l | (Object) | DEMAND |
| d(t) | Integer Var. | VARIABLE INDICATING NUMBER OF DEMAND HO-ODU ROUTE PATTERNS t TO BE EMPLOYED |
| $x_{h10}(h)$ | Integer Var. | NUMBER OF 10G HO-ODUs IN HO-ODU ROUTE h |
| $x_{h100}(h)$ | Integer Var. | NUMBER OF 100G HO-ODUs IN HO-ODU ROUTE h |
| Demand_Cap(t) | Const. | BANDWIDTH PER DEMAND HO-ODU ROUTE PATTERN t |
| I(h, t) | 0/1 Integer. Const. | IDENTIFIER FOR IDENTIFYING WHETHER HO-ODU ROUTE h IS CONTAINED IN DEMAND HO-ODU ROUTE PATTERN t<br>1: CONTAINED, 0: NOT CONTAINED |
| T(l, t) | 0/1 Integer. Const. | IDENTIFIER FOR IDENTIFYING WHETHER DEMAND HO-ODU ROUTE PATTERN t IS ATTRIBUTED TO DEMAND l<br>1: t IS ATTRIBUTED TO DEMAND l<br>0: t IS NOT ATTRIBUTED TO DEMAND l |
| TotalDemandNum | Const | TOTAL NUMBER OF DEMANDS |
| WavelengthLimit(s) | Const | LIMITATION ON NUMBER OF WAVELENGTHS IN LINK s |
| Link(s, h) | 0/1 Integer. Const. | IDENTIFIER FOR IDENTIFYING WHETHER HO-ODU ROUTE h CONTAINS LINK s<br>1: h CONTAINS LINK s<br>0: h DOES NOT CONTAIN LINK s |

FIG.10

| Name | Type | Description |
|---|---|---|
| x | (Object) | DEMAND |
| y | (Object) | HO-ODU |
| s(x, y) | 0/1 Integer Var. | IDENTIFIER: WHETHER DEMAND x IS ACCOMMODATED IN HO-ODU y? 1: YES, 0: NO |
| HO-ODU(y) | 0/1 Integer Var | IDENTIFIER: WHETHER HO-ODU y IS USED? 1: YES, 0: NO |
| Demand_Cap(x) | Const. | BANDWIDTH OF DEMAND x |
| Demand_Num(x) | Const. | NUMBER OF DEMANDS x ALLOCATED TO CURRENT HO-ODU ROUTE |
| HOODU_Cap(y) | Const. | CAPACITY OF HO-ODU y |
| M | Const. | Big Number (for only model use) |

DEMAND ACCOMMODATION DESIGNING SYSTEM AND METHOD

CROSS-REFERENCE TO RELATED APPLICATION

This patent application is based upon, and claims the benefit of priority of Japanese Patent Application No. 2011-232251 filed on Oct. 21, 2011, the entire contents of which are incorporated herein by reference.

FIELD

The embodiments discussed herein relate to a demand accommodation system and a demand accommodation method.

BACKGROUND

The ITU Telecommunication Standardization Sector (ITU-T) has issued a Recommendation of an optical transport network (OTN) as a platform of transparent transport. The transparent transport allows client signals to be communicated between end users without any concerns of higher layers and lower layers of not only synchronous networks such as a synchronous optical network (SONET) or a synchronous digital hierarchy (SDH) but also asynchronous networks such as Internet Protocol (IP) or Ethernet (Registered Trademark) in the wavelength division multiplex (WDM) system that is adapted for explosive growth of the Internet traffic. The OTN is rapidly introduced into commercial systems as interfaces and formats for the OTN are already standardized based on Recommendation G.709 issued by the ITU-T. Henceforth, a method for constructing an optical network may play an important role for flexibly operating OTN signal paths utilizing an OTN cross-connect (XC) device.

Initially, a process of accommodating demands into an optical path is described with reference to FIGS. 1A and 1B. Note that an optical channel data unit (ODU) frame serving as a lower-rate signal transport frame that accommodates client signals is called a "lower order ODU (LO-ODU)", and an ODU frame that multiplexes and accommodates such low-rate ODU frames is called a "higher order ODU (HO-ODU)". In the OTN, the HO-ODU serving as an optical path accommodates the LO-ODU accommodating client signals by issuing a demand for specifying a signal transmission route from a start-point node to an end-point node.

For example, in FIG. 1A, a demand D1 specifies an optical path having a route of nodes 1, 2 and 3 (a start-point node is node 1 and an end-point node is node 3). A demand D2 specifies an optical path having a route of nodes 4, 3, 5 and 6.

The optical paths are implemented by the HO-ODU. For example, in FIG. 1B, the optical path P1 of the HO-ODU is configured between the nodes 4 and 3 and between the nodes 3 and 5. Further, the optical path P2 is configured between the nodes 5 and 6. The aforementioned demand D2 that specifies the optical path having the route of nodes 4, 3, 5 and 6 is implemented by the optical paths P1 and P2.

Meanwhile, there are proposed technologies for suppressing the increase of computational time in designing of the optical path (e.g., Patent Documents 1 and 2). These technologies introduces the concept of the "constraint of solution space" in the designing of the optical path within the optical network by mathematical programming in order to suppress the increase of computing time.

Further, there is proposed a minimization design for minimizing cost of links and nodes corresponding to the probabilistic demand pattern (e.g., Patent Document 3).

RELATED ART DOCUMENT

Patent Document 1: Japanese Laid-open Patent Publication No. 2007-311900
Patent Document 2: Japanese Laid-open Patent Publication No. 2004-80666
Patent Document 3: Japanese Laid-Open Patent Publication No. 11-215124

The optical path may be designed to accommodate demands. Such a design method includes aggregation and grooming. The aggregation indicates, as illustrated in FIG. 2A, a design to aggregate demands having an identical route formed of the same start-point and end-point, and accommodate such aggregated demands into an HO-ODU of one optical path. In FIG. 2A, circles represent nodes, double arrow lines represent demands, and enclosed solid lines each containing plural demands represent HO-ODUs. For example, in FIG. 2A, demands D4 and D5 that specifies routes of nodes N1, N2 and N3 are accommodated in an HO-ODU 11.

The grooming indicates, as illustrated in FIG. 2B, a design to configure an HO-ODU 12 between the nodes N1 and N2, and accommodate plural demands having routes of the nodes N1 and N2 (i.e., all the demands in the example of FIG. 2B) in the HO-ODU 12. Likewise, plural demands having routes of the nodes N2 and N3 are accommodated in an HO-ODU 13, and plural demands having routes of the nodes N2 and N4 are accommodated in an HO-ODU 14.

The demand accommodation method for accommodating the demands between the nodes N1 to N4 by utilizing such aggregation and the grooming may have the following accommodation types illustrated in FIGS. 3A to 3D. Note that FIGS. 3A and 3B illustrate designs identical to those illustrated in FIGS. 2A and 2B. In FIG. 3C, HO-ODUs 15, 16 and 17 are provided between the nodes N2 and N3, and in FIG. 3D, HO-ODUs 18 and 19 are provided between the nodes N2 and N3.

However, in the related art, the accommodation types of the demand accommodation method utilizing such aggregation and the grooming illustrated in FIGS. 3A to 3D are not selected for designing the efficient routes of the optical paths at minimum cost.

The disclosed demand accommodation design system may be capable of accommodating demands in optical paths utilizing grooming at minimum cost.

SUMMARY

According to an aspect of the embodiments, there is provided a demand accommodation design system for accommodating a demand, the demand specifying a signal transmission route from a start-point node to an end-point node within an optical network, the demand accommodation design system including an analytical unit configured to acquire at least one optical path candidate for minimizing cost of the optical network by solving an objective function incorporating cost of optical path candidates by bandwidth, the optical path candidate being a candidate for an optical path composing a demand, and a mathematical programming problem employing a constraint condition incorporating a bandwidth of an optical path pattern candidate connecting the start-point node and the end-point node of the demand and a bandwidth of the at least one acquired optical path candidate, the optical path pattern candidate being the acquired optical path candidate itself or being obtained by combining the optical path candidates; and an allocation unit configured to allocate the demand to the at least one acquired optical path candidate for minimizing the cost to accommodate the demand.

The object and advantages of the invention will be realized and attained by means of the elements and combinations particularly pointed out in the appended claims.

It is to be understood that both the foregoing general description and the following detailed description are exemplary and explanatory and are not restrictive of the invention.

Additional objects and advantages of the embodiments will be set forth in part in the description which follows, and in part will be obvious from the description, or may be learned by practice of the invention.

BRIEF DESCRIPTION OF THE DRAWINGS

FIGS. 3A to 3D are diagrams illustrating accommodation types of demands;

FIGS. 6A and 6B are diagrams illustrating an HO-ODU route candidate and a demand HO-ODU route candidate;

FIG. 7 is a diagram illustrating analytical results of steps S15 and S16;

FIG. 9 is a diagram illustrating a list of variables used in a mixed integer programming (MIP) model;

FIG. 10 is a diagram illustrating a list of variables used in a bin packing model;

DESCRIPTION OF EMBODIMENTS

In the following, a description is given, with reference to the accompanying drawings, of the embodiments.

Configuration of Demand Accommodation Design System

Figure 1A:
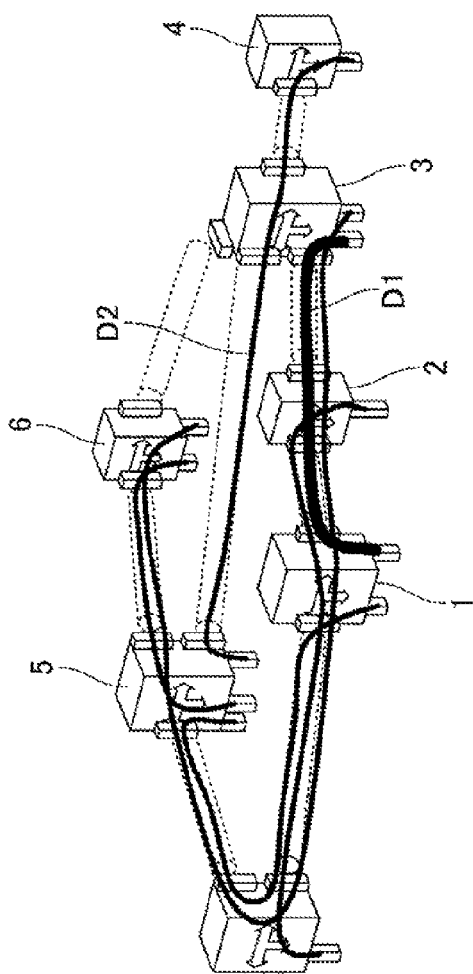
FIGS. 1A and 1B are diagrams illustrating optical paths accommodating demands.
Figure 1B:
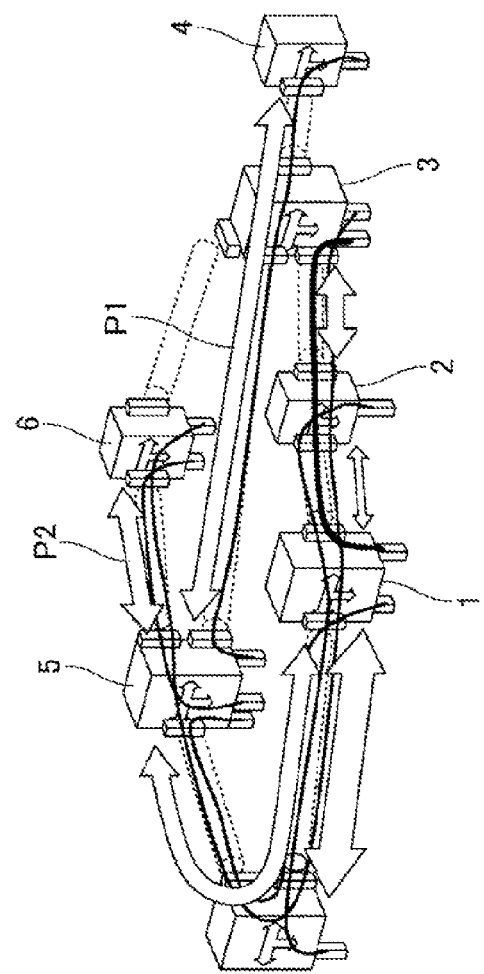
Figure 2B:
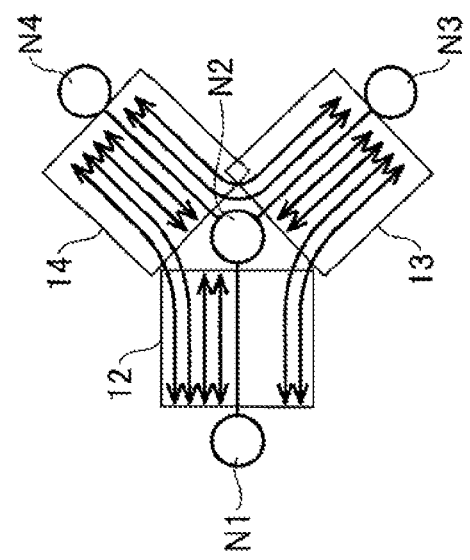
FIGS. 2A and 2B are diagrams illustrating aggregation and grooming, respectively.
Figure 2A:
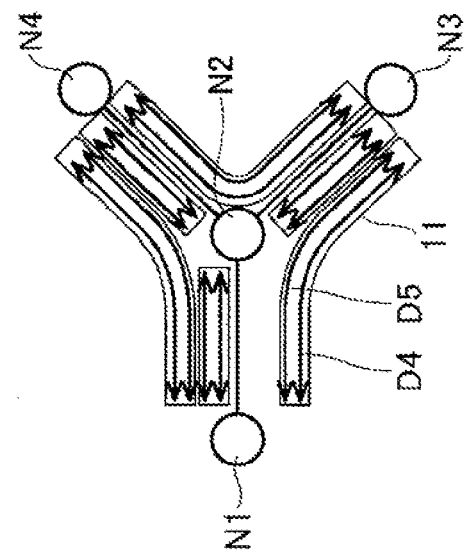
Figure 4:
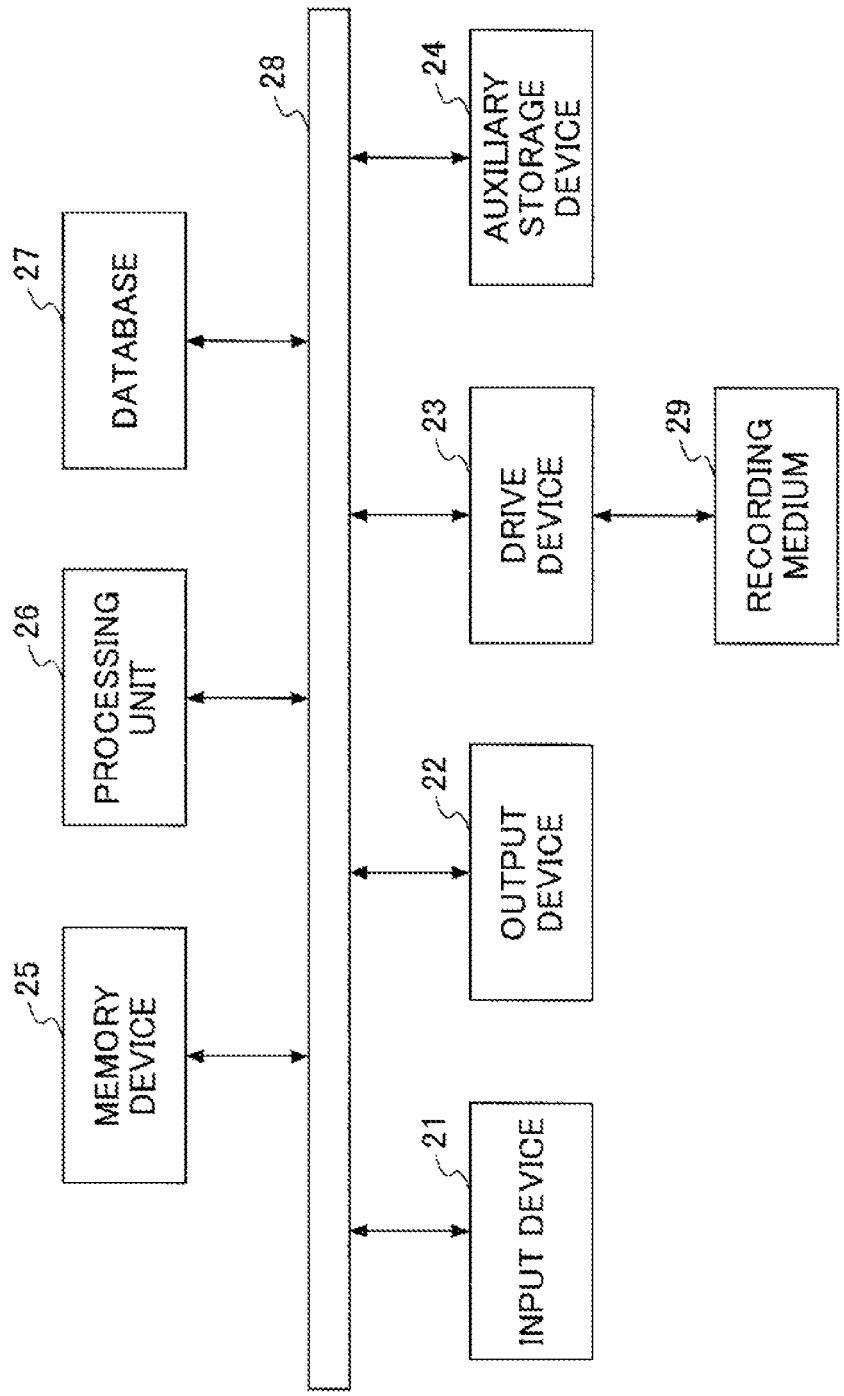
FIG. 4 is a hardware configuration diagram illustrating a demand accommodation design system according to an embodiment.

FIG. 4 is a hardware configuration diagram illustrating a demand accommodation design system according to an embodiment. As illustrated in FIG. 4, the demand accommodation design system includes an input device 21, an output device 22, a drive device 23, an auxiliary storage device 24, a memory device 25, an processing unit 26 and a database 27, which are mutually connected via a system bus 28. The demand accommodation design system may have a special-purpose configuration; however, may have a general-purpose configuration such as a personal computer or a workstation.

The input device 21 includes a keyboard and a mouse via which a user inputs various data. The output device 22 includes a display configured to display various windows and data necessary for running programs of the demand accommodation design system based on the execution of the programs. The programs to be executed may be distributed via a recording medium 29 such as a CD-ROM. The recording medium 29 recording the programs to be executed is placed in the drive device 23, and the programs stored in the recording medium 29 are then installed in the memory device 25 via the drive device 23.

The processing unit 26 is configured to control the entire processing of the demand accommodation design system including various arithmetic processes and the later-described various processes based on the executed programs retrieved from the memory device 25. Further, the various information necessary for the programs in execution may be acquired from the database 27 or stored in the database 27. Note that the processing unit 26 is configured to implement an analytical unit configured to acquire the later-described optical path candidate for minimizing cost of an optical network by solving the later-described objective function and mathematical programming problem, an allocation unit configured to allocate a demand to the acquired optical path candidate, and an extraction unit configured to extract the later-described optical path pattern candidate by combining the optical path candidates.

Flowchart of Demand Accommodation Design Processing According to Embodiment

Figure 5:
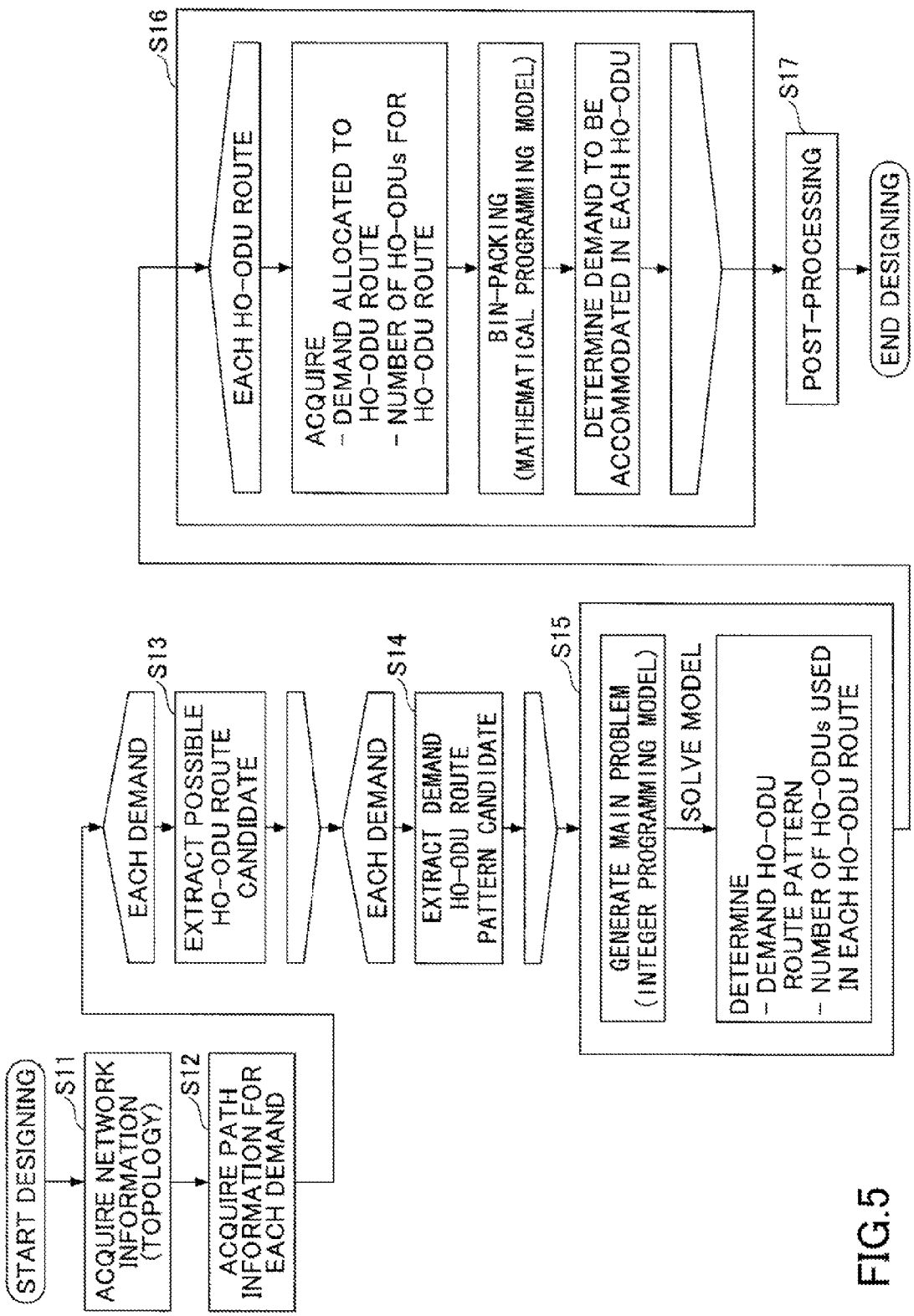
FIG. 5 is a flowchart illustrating demand accommodation design processing according to an embodiment.

FIG. 5 is a flowchart illustrating demand accommodation design processing according to an embodiment. Note that the demand accommodation design processing according to the embodiment is implemented by the processing unit 26. In FIG. 5, a network topology that is basic information of an optical network is acquired in step S11. Further, path information of all the demands for the above optical network is acquired in step S12. Each of the demands includes a route from a start-point node via intermediary nodes to an end-point node per an LO-ODU unit that accommodates a client signal. Note that a bandwidth of each of the LO-ODUs (e.g., ODU1, ODU2, etc.) is determined.

Subsequently, preprocessing is executed in steps S13 and S14. In step S13, possible optical path(s) that may be used for each demand is extracted as HO-ODU route candidate(s). Note that the routes that have not acquired any demands are not extracted as the HO-ODU route candidates.

Initially, a demand from a start-point node 31 via four nodes 32, 33, 34 and 35 to an end-point node 36 is described with reference to FIG. 6A. In this case, there are an HO-ODU route candidate 1 serving as an optical path candidate connecting the nodes 31 and 33, an HO-ODU route candidate 2 serving as an optical path candidate connecting the nodes 33 and 34, and an HO-ODU route candidate 3 serving as an optical path candidate connecting the nodes 34 and 36 as illustrated in FIG. 6A. In addition, there is an HO-ODU route candidate 4 serving as an optical path candidate connecting the nodes 33 and 35. Further, there are an HO-ODU route candidate 6 serving as an optical path candidate connecting the nodes 31 and 32, an HO-ODU route candidate 7 serving as an optical path candidate connecting the nodes 32 and 35, and an HO-ODU route candidate 5 serving as an optical path candidate connecting the nodes 35 and 36. There are an HO-ODU route candidate 8 serving as an optical path candidate connecting the nodes 31 and 36, and an HO-ODU route candidate 9 serving as an optical path candidate connecting the nodes 31 and 34.

Subsequently, in step S14, a demand HO-ODU route pattern candidate may be extracted for each of the demands as an optical path pattern candidate connecting a start-point node and an end-point node by combining optical path candidates. Note that the routes that have not acquired any demands are not extracted as the demand HO-ODU route pattern candidates.

As illustrated in FIG. 6B, there is a demand HO-ODU route pattern candidate 1 including the HO-ODU route candidate 1, the HO-ODU route candidate 2 and the HO-ODU route candidate 3 corresponding to the demands and the HO-ODU route candidates that are illustrated in FIG. 6A. In addition, there are a demand HO-ODU route pattern candidate 2 including the HO-ODU route candidate 1, the HO-ODU route candidate 4 and the HO-ODU route candidate 5 corresponding to the demands and the HO-ODU route candidates that are illustrated in FIG. 6A, and a demand HO-ODU route pattern candidate 3 including the HO-ODU route candidate 6, the HO-ODU route candidate 7 and the HO-ODU route candidate 5 corresponding to the demands and the HO-ODU route candidates that are illustrated in FIG. 6A. Further, there are a demand HO-ODU route pattern candidate 4 including the HO-ODU route candidate 8 and a demand HO-ODU route pattern candidate 5 including the HO-ODU route candidate 9 and the HO-ODU route candidate 3 as illustrated in FIG. 6B.

Next, a mixed integer programming model that is a "main problem" is generated and the generated main problem is analyzed in step S15. In this process, the main problem may be solved by mathematical programming utilizing the mixed integer programming model having an objective function and a constraint condition. The objective function indicates the reduction of a total cost of the HO-PDUs generated by bandwidth. The first constraint condition in this case may be a total number of optical path pattern candidates selected for each demand being equal to a total number of demands. The second constraint condition may be a total amount of bandwidth for the demand HO-ODU route pattern candidate that passes through the selected HO-ODU route candidates being less than or equal to a sum of products of the number of HO-ODUs allocated by bandwidth and the bandwidth of the corresponding HO-ODU (hereinafter also called the "HO-ODU bandwidth"). The third constraint condition may be the number of HO-ODUs being less than or equal to a limiting value for limiting the number of wavelengths for each link.

The information acquired from the analysis conducted in step S15 includes the number of HO-ODUs required for a corresponding one of the HO-ODU bandwidths (e.g., 10 Gbps, 100 Gbps) and the number of demands stored in each of the HO-ODU route candidates.

Accordingly, as illustrated in an upper part of FIG. 7, two HO-ODUs each having a bandwidth of 100 Gbps and five HO-ODUs each having a bandwidth of 10 Gbps may be required for the HO-ODU route candidate 1 connecting the nodes 31 and 33. Hence, a demand #1 of a bandwidth BW 8, a demand #2 of a bandwidth BW 2 and demands #3 to #60 of a bandwidth BW 1 may be accommodated by a total number of seven HO-ODUs. Note that the bandwidth BW 1 represents a bandwidth (e.e., 1.25 Gbps) corresponding to one tributary slot of the LO-ODU 0, the bandwidth BW 2 represents a bandwidth of 2.5 Gbps corresponding to two tributary slots of the LO-ODU 1, the bandwidth BW 8 represents a bandwidth of 10 Gbps corresponding to eight tributary slots of the LO-ODU 2, and the bandwidth BW 80 represents a bandwidth of 80 Gbps corresponding to 80 tributary slots of the LO-ODU 4.

Next, allocation of the demands to be accommodated in the adequate HO-ODUs are specifically determined in step S16. In step S16, analysis is conducted by mathematical programming utilizing a bin-packing model. The bin packing problem may be solved for each of the HO-ODU route candidates based on the analytical result of the main problem computed in step S15. In the example of FIG. 17, it is determined that the two HO-ODUs each having a 100 Gbps bandwidth and five HO-ODUs each having a 10 Gbps bandwidth are used for accommodating the demand #1 of the bandwidth BW 8, the demand #2 of the bandwidth BW 2 and the demands #3 to #60 of the bandwidth BW 1.

In this case, as illustrated in a lower part of FIG. 77, the demands #1, #8, . . . , #55 may be accommodated in the HO-ODU having the first 100 Gbps bandwidth, and the demands #2, #6, . . . , #60 may be accommodated in the HO-ODU having the second 100 Gbps bandwidth. Then, the demand #7 may be accommodated in the HO-ODU having the first 10 Gbps bandwidth, the demands #11 and #18 may be accommodated in the HO-ODU having the second 10 Gbps bandwidth, the demands #5 and #23 may be accommodated in the HO-ODU having the third 10 Gbps bandwidth, the demands #19 and #38 may be accommodated in the HO-ODU having the fourth 10 Gbps bandwidth, and the demands #32 and #36 may be accommodated in the HO-ODU having the fifth 10 Gbps bandwidth.

Thereafter, post-processing such as wavelength allocation for each of the HO-ODUs accommodating the demands and determination of transmission/reception nodes may be performed to end the demand accommodation design processing.

HO-ODU Route Candidate Extraction Processing

Next, HO-ODU route candidate extraction processing to be executed in step S13 is described more in detail. According to the embodiment, of the nodes composing an optical network, the node having three or more links is called a "hub site". Note that the link indicates an optical transmission line that connects adjacent nodes, which is also called a "span".

Figure 8A:
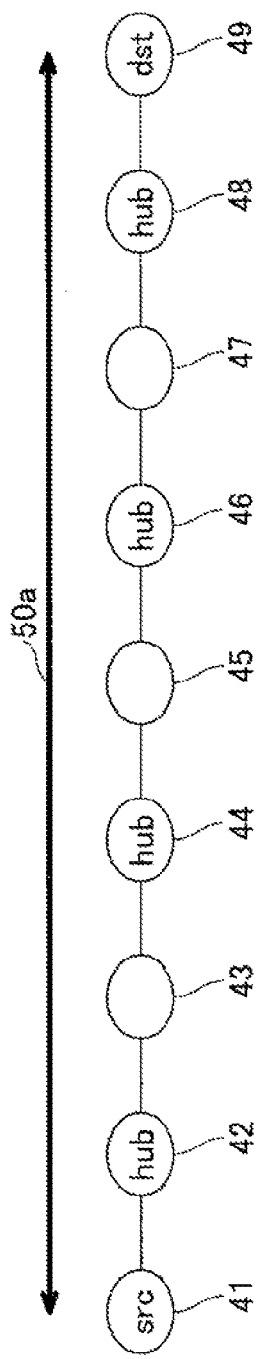
FIGS. 8A to 8C are diagrams illustrating extraction of the HO-ODU route candidate.

Suppose a case illustrated in FIG. 8A where a demand has a start-point node (src) 41 and an end-point node (dst) 49, has a route of nodes 41, 42, 43, 44, 45, 46, 47, 48 and 49, and among these, the nodes 42, 44, 46 and 48 are hub sites (hub).

First of all, a route directly connecting the start-point node 41 and the end-point node 49 is extracted as an HO-ODU route candidate 50a, as illustrated in FIG. 8A.

Figure 8B:
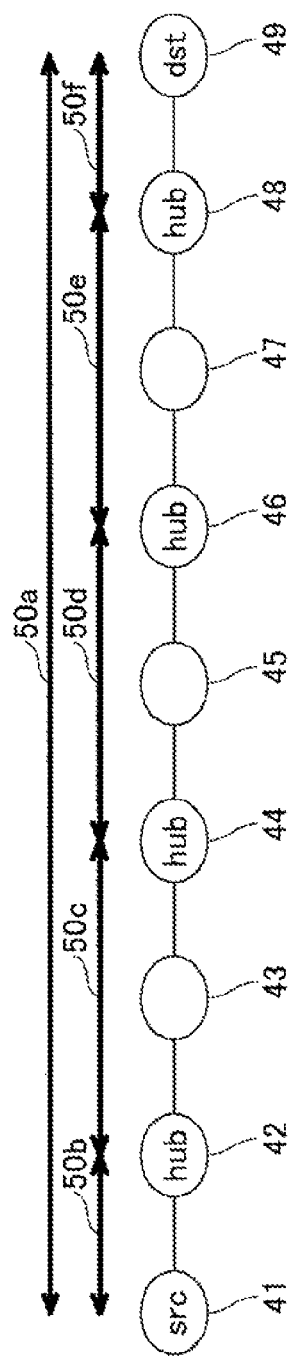

Secondly, routes that directly connect the hub sites between the start-point node 41 and the end-point node 49 within the demand route are extracted as HO-ODU route candidates 50b, 50c, 50d, 50e and 50f as illustrated in FIG. 8B.

Figure 8C:
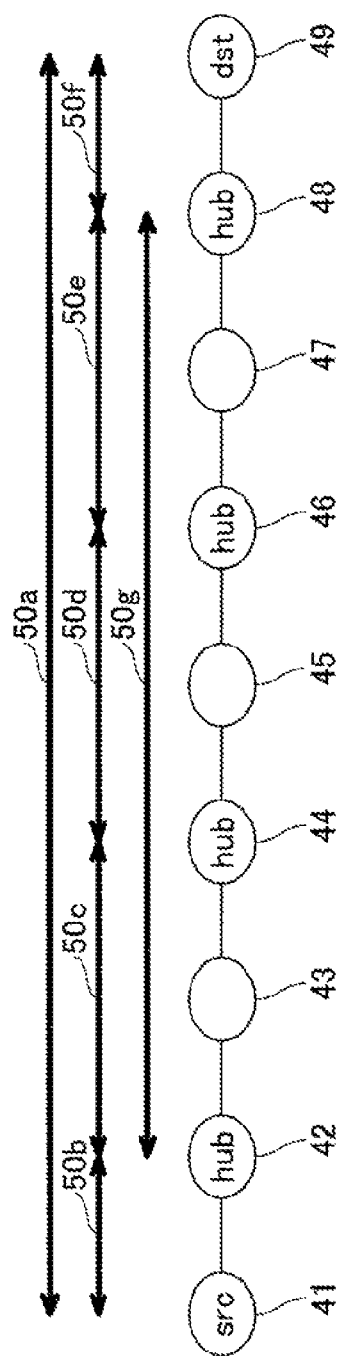

Thirdly, a route directly connecting the start-point node 41 and the end-point node 49 and also connecting the hub sites located closest to the start-point node 41 and the end-point node 49 are extracted as an HO-ODU route candidate 50g, as illustrated in FIG. 8C.

The aforementioned method is a typical HO-ODU route candidate extraction method; however, additional extraction methods may be performed as follows.

Fourthly, routes directly connecting adjacent sites are extracted as HO-ODU route candidates.

Fifthly, any two of the hub sites within the demand route are selected and routes directly connecting the selected two hub sites are extracted as HO-ODU route candidates.

Sixthly, the number of hops in each of the HO-ODU route candidates or the number of nodes composing each of the HO-ODU route candidates is compared to a predetermined upper limit or lower limit, any one of conditions where the number of hops or the number of nodes is less than or equal to, or greater than or equal to the predetermined upper or lower limit are extracted from all the HO-ODU route candidates extracted by the aforementioned first to fifth processes.

Demand HO-ODU Route Pattern Candidate Extraction Processing

Next, demand HO-ODU route pattern candidate extraction processing to be executed in step S14 is described more in detail. Basically, demand HO-ODU route pattern candidates are determined by listing all the HO-ODU route pattern candidates capable of being extracted corresponding to each of the demands from the HO-ODU route candidates. That is, the extracted HO-ODU route candidate itself or a combination of the extracted HO-ODU route candidates is extracted as the demand HO-ODU route pattern candidate that connects a start-point node and an end-point node.

For example, demand HO-ODU route pattern candidates 1 to 5 illustrated in FIG. 6B are extracted based on the demands and the HO-ODU route candidates illustrated in FIG. 6A.

However, a constraint condition in which the number of HO-ODU switching times for each demand may be limited to predetermined times or less may be added according to a case. If the constraint condition in which the number of HO-ODU switching times is limited to one or less is added to a case of the demands and the HO-ODU route candidates illustrated in FIG. 6A, the demand HO-ODU router pattern candidates 4 and 5 that satisfy the aforementioned constraint condition may be extracted from the demand HO-ODU route pattern candidates 1 to 5 illustrated in FIG. 6B. Note that the method for adding the constraint condition is not limited to the method described above.

Main Problem Generation and Analytical Processing

Next, main problem generation and analytical processing to be executed in step S15 is described more in detail. Note that in the following examples, there may be two bandwidths of 10 Gbps and 100 Gbps set as the HO-ODU bandwidths. Further, a list of variables used in a mixed integer programming (MIP) model is illustrated in FIG. 9.

In FIG. 9, t represents a demand HO-ODU route pattern candidate number, h represents an HO-ODU route candidate number, s represents a link number or a span number within an optical network and l represents a demand number. d(t) represents a variable to determine how many demand HO-ODU pattern candidates t to be employed, $X_{h10}(h)$ represents the number of 10 Gbps HO-ODUs to be used in the HO-ODU route candidate h, and $X_{h100}(h)$ represents the number of 100 Gbps HO-ODUs to be used in the HO-ODU route candidate h.

Demand_Cap(t) represents a bandwidth per demand HO-ODU route pattern candidate t, I(h,t) represents an identifier to identify whether the HO-ODU route candidate his contained in the demand HO-ODU route pattern candidate t (1: contained, 0: not contained), and T(l,t) represents an identifier to identify whether the demand HO-ODU route pattern candidate t is attributed to the demand l (1: attributed, 0: not attributed).

TotalDemandNum represents a total number of demands, WavelengthLimit(s) represents an upper limit of the a limiting value for limiting the number of wavelengths in the link s, and Link(s,h) represents an identifier to identify whether the links is contained in the HO-ODU route candidate h (1: contained, 0: not contained). Further, a coefficient "8" to be applied to the $X_{h10}(h)$ represents the number of 10 Gbps HO-ODU tributary slots, which represents a bandwidth of 8×1.25 Gbps. A coefficient "80" to be applied to the $X_{h100}(h)$ represents the number of 100 Gbps HO-ODU tributary slots, which represents a bandwidth of 80×1.25 Gbps.

In this case, the following formula (1) represents the objective function. In the formula (1), $cost_{h10}$ indicates cost used for the 10 Gbps HO-ODUs, and $cost_{h100}$ indicates cost used for the 100 Gbps HO-ODUs. The cost indicates expenditure on the use of the HO-ODUs. For example, the $cost_{h100}$ is set several times the $cost_{h10}$. Since the costh100 and costh10 are constants, they may be set at any values in accordance with a design condition.

The formula (1) indicates a total cost of the 10 Gbps HO-ODUs and the 100 Gbps HO-ODUs being minimized.

$$\text{Minimize:} \sum_h cost_{h10} \cdot x_{h10}(h) + cost_{h100} \cdot x_{h100}(h) \quad (1)$$

The following formulas (2), (3), and (4) represent constraint conditions. The formula (2) represents a total number of optical path pattern candidates selected for each demand being equal to a total number of demands. The formula (3) represents a total amount of bandwidth of the demand HO-ODU route pattern candidate that passes through (or contained in) the selected HO-ODU route candidates being less than or equal to a sum of products of the number of HO-ODUs allocated by bandwidth and the corresponding HO-ODU bandwidth. The formula (4) represents the number of HO-ODUs being less than or equal to a limiting value for limiting the number of wavelengths for each link.

$$\sum_t T(l, t) \cdot d(t) = TotalDemandNum \quad (2)$$

(for ∀ l)

$$\sum_t \text{Demand\_Cap}(t) \cdot I(h, t) \cdot d(t) \leq 8 \cdot x_{h10}(h) + 80 \cdot x_{h100}(h) \leq 0 \quad (3)$$

(for ∀ h)

$$\sum_h \text{Link}(s, h) \cdot (x_{h10}(h) + x_{h100}(h)) \leq WavelengthLimit(s) \quad (4)$$

(for ∀ s)

Note that in the above formulas (1) to (4), two bandwidths of 10 Gbps and 100 Gbps are set as the HO-ODU bandwidths. However, the HO-ODU bandwidth is not limited to the two bandwidths. There may be one bandwidth or three or more bandwidths set as the HO-ODU bandwidth(s).

Bin Packing Generation and Analytical Processing

Next, allocation and accommodation processing to be executed in step S16 is described. As a simple example of this process, if a large basket represents a 100 Gbps HO-ODU, a small basket represents a 10 Gbps HO-ODU and an apple represents a demand, it is determined how efficiently apples are accommodated in the respective baskets each having a limited capacity. Since this is a simple bin packing problem, an existing solution, namely, the mathematical programming approach or an existing heuristic approach (e.g., greedy algorithm) may be used.

The objective function and constraint conditions of the bin packing problem are illustrated as follows. Further, a list of variables used in a bin packing model is illustrated in FIG. 10. In FIG. 10, x represents a demand number, y represents an HO-ODU number, s(x,y) represents an identifier to identify whether the demand x is stored in the HO-ODU y (1: stored, 0: not stored), HO-ODU(y) represents an identifier to identify whether the HO-ODU y is used (1: used, 0: not used), Demand_Cap (x) represents a bandwidth of the demand x, Demand_Num(x) represents the number of demands x allocated to a current HO-ODU route candidate, HO-ODU_Cap (y) represents the capacity of the HO-ODU y, and M represents a large number such as 10,000.

In this case, the following formula (5) represents the objective function. The formula (5) represents the minimum number of HO-ODUs to be used. The following formulas (6), (7), and (8) represent constraint conditions. The formula (6) represents the demand x being accommodated in the HO-ODU y. The formula (7) represents a total bandwidth of the demands accommodated in the HO-ODU being less than or equal to the capacity of the HO-ODU. The formula (8) represents the HO-ODU accommodating any one of the demands being identified as the HO-ODU "to be used".

$$\text{Minimize:} \sum_{y \forall HOODU} HOODU(y) \quad (5)$$

$$\sum_{y \forall HOODU} S(x, y) = \text{Demand\_Num}(x) \quad (6)$$

$$(\text{for } \forall x)$$

$$\sum_{x \forall Demand} \text{Demand\_Cap}(x) \times S(x, y) \leq HOODU\_Cap(y) \quad (7)$$

$$(\text{for } \forall y)$$

$$\sum_{x \forall Demand} S(x, y) - M \times HOODU(y) \leq 0 \quad (8)$$

$$(\text{for } \forall y)$$

According to an embodiment, the demand accommodation design processing includes step S15 in which the number of HO-ODUs corresponding to each bandwidth of the HO-ODU route is estimated from demand distribution and step S16 in which the demand is arranged to a specific HO-ODU, separately. Further, a mathematical programming model may be generated while suppressing the redundant variables by contriving the candidate acquisition in preprocessing of step S15. According to the embodiments of the demand accommodation design method and system, the computational time may be reduced compared to the related art methods and systems, and an optimal solution for minimizing the cost of the entire optical network may be acquired.

Figure 11:
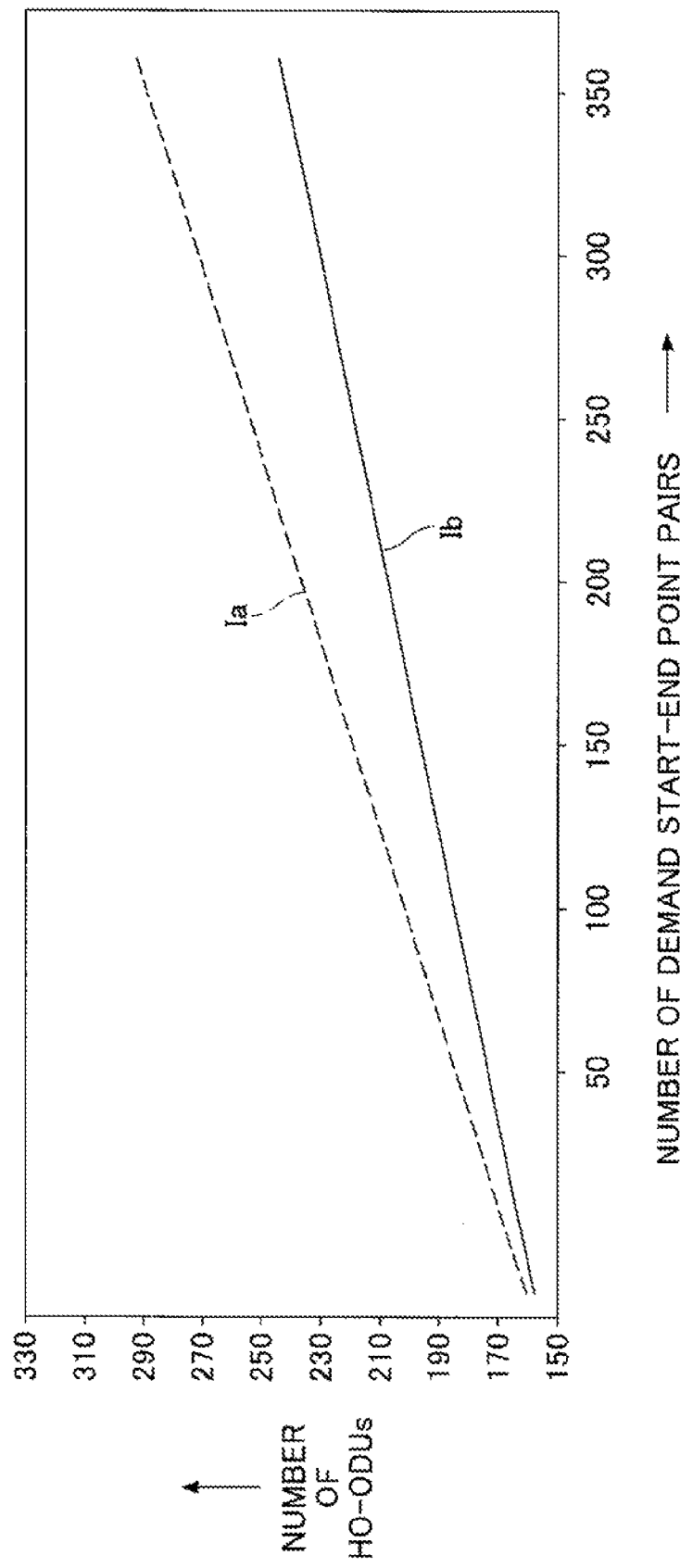
FIG. 11 is a diagram illustrating a comparison between a heuristic method and a method according to the embodiment.
Figure 12:
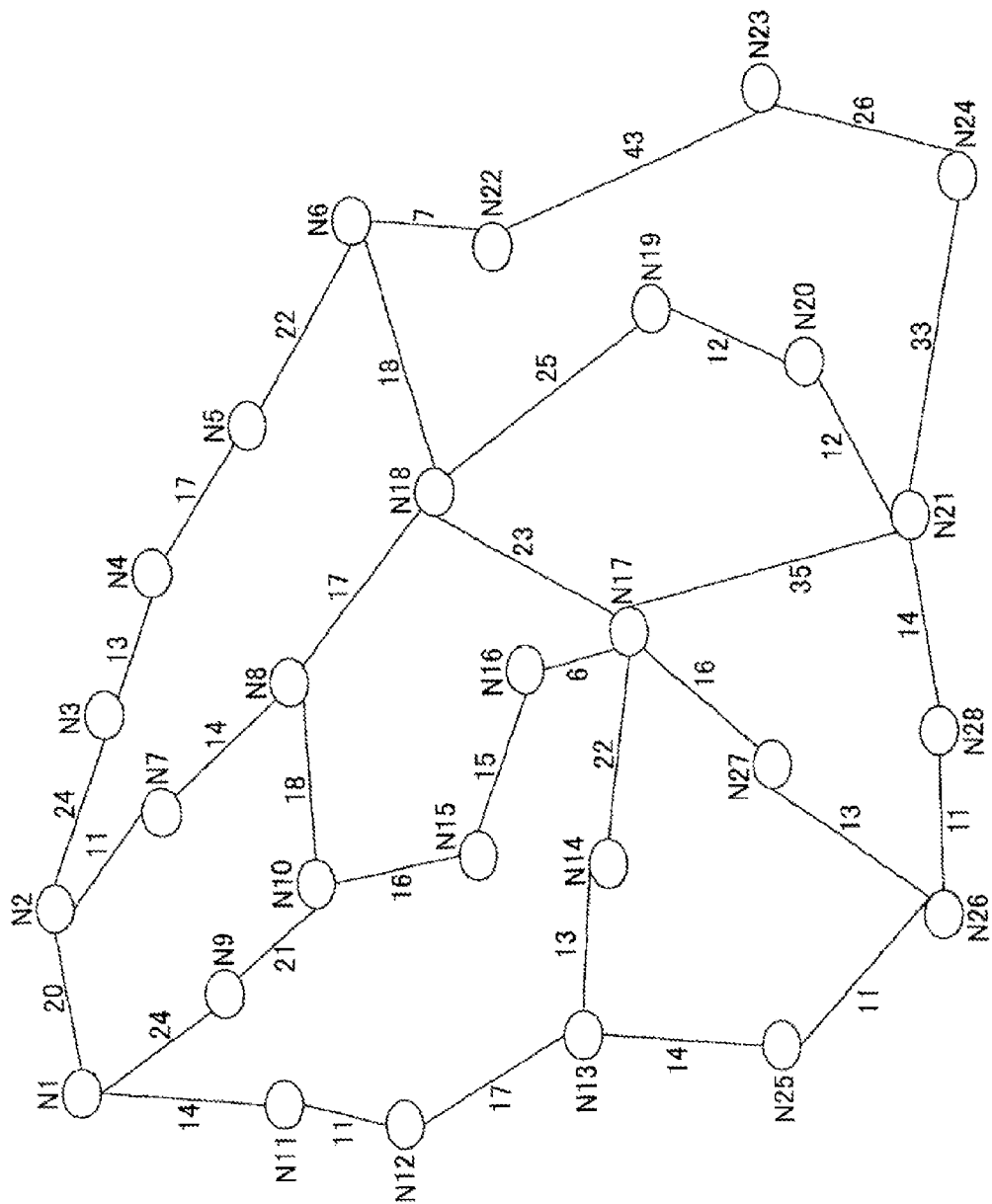
FIG. 12 is a diagram illustrating an optical network configuration used in a comparison.

Note that FIG. 11 illustrates a comparison between a heuristic method based on the existing approach and a method according to the embodiment. FIG. 12 illustrates an optical network configuration used in the comparison. Note that the heuristic method indicates generating an HO-ODU by aggregating demands each having an identical start-point and an identical end-point from plural demands. Thereafter, the remaining demands are accommodated in the HO-ODUs having bandwidth allowance in the order from the shortest demand to the longest demand. If there are no HO-ODUs having bandwidth allowance, new HO-ODUs are generated for accommodating the remaining demands.

In FIG. 12, the optical network includes nodes N1 to N28. Numerals attached to links represented by solid lines connecting the nodes each indicate a distance (km) between the nodes. In FIG. 11, a horizontal axis indicates the number of start-point and end-point pairs of the corresponding demands (hereinafter called "demand start-end point pairs"). A broken line Ia represents a change in the number of HO-ODUs according to the heuristic method and a solid line Ib represents a change in the number of HO-ODUs according to the embodiment. Compared to the heuristic method, the embodiment may be capable of reducing the number of HO-ODUs as the number of demand start-end pairs increases. Specifically, the embodiment may be capable of reducing the number of HO-ODUs by 30% or more approximately at a point of 350 demand start-end point pairs, and the cost relative to the reduced number of the HO-ODUs may be reduced as a result.

According to the aforementioned embodiments, the demand accommodation design method and system may be capable of accommodating demands in optical paths utilizing grooming so as to minimize the cost such as the cost of the entire optical network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A demand accommodation design system for accommodating a demand, the demand specifying a signal transmission route from a start-point node to an end-point node within an optical network, the demand accommodation design system comprising:
    an analytical unit configured to acquire at least one optical path candidate for minimizing cost of the optical network by solving
        an objective function incorporating cost of optical path candidates by bandwidth, the optical path candidate being a candidate for an optical path composing a demand, and
        a mathematical programming problem employing a constraint condition incorporating a bandwidth of an optical path pattern candidate connecting the start-point node and the end-point node of the demand and a bandwidth of the at least one acquired optical path candidate, the optical path pattern candidate being the acquired optical path candidate itself or being obtained by combining the optical path candidates; and
    an allocation unit configured to allocate the demand to the at least one acquired optical path candidate for minimizing the cost to accommodate the demand.

2. The demand accommodation design system as claimed in claim 1, further comprising:
    an extraction unit configured to extract the optical path pattern candidate connecting the start-point node and the end-point node of the demand by combining the optical path candidates, the optical path candidate being a candidate for an optical path composing a demand.

3. The demand accommodation design system as claimed in claim 2, wherein
    the objective function utilized in the analytical unit minimizes a sum of products of a cost of the optical path candidates by bandwidth and a number of the optical path candidates for a corresponding bandwidth.

4. The demand accommodation design system as claimed in claim 3, wherein
    the constraint condition includes a condition in which a total number of the optical path pattern candidates selected for the demand is equal to a total number of demands.

5. The demand accommodation design system as claimed in claim 4, wherein
    the constraint condition further includes a condition in which a total amount of bandwidth of the optical path pattern candidate that passes through the optical path candidates is less than or equal to a sum of products of a number of optical paths by bandwidth and a bandwidth of the corresponding optical path.

6. The demand accommodation design system as claimed in claim 5, wherein
the constraint condition further includes a condition in which a number of the optical path candidates is less than or equal to a limiting value for limiting a number of wavelengths for each link.

7. The demand accommodation design system as claimed in claim 2, wherein
the extraction unit extracts a signal transmission route from the start-point node to the end-point node of the demand as the optical path candidate.

8. The demand accommodation design system as claimed in claim 7, wherein
the extraction unit further extracts, as the optical path candidate, a route connecting a hub site and one of the start-point node and the end-point node, or a route connecting hub sites, the hub site being a node having three or more links on the signal transmission route of the demand.

9. The demand accommodation design system as claimed in claim 8, wherein
the extraction unit further extracts, as the optical path candidate, a route connecting the hub sites, one of the hub sites being located closest to the start-point node and the other being located closest to the end-point node.

10. The demand accommodation design system as claimed in claim 9, wherein
the extraction unit extracts, as the optical path pattern candidate, one of the optical path candidates and patterns each connecting the start-point node and the end-point node of the demand obtained by combining the optical path candidates.

11. The demand accommodation design system as claimed in claim 10, wherein
the extraction unit extracts, as the optical path pattern candidate, one of the patterns having a number of optical path candidate switching times being a predetermined number of times or less.

12. A demand accommodation design method for accommodating a demand, the demand specifying a signal transmission route from a start-point node to an end-point node within an optical network, the demand accommodation design method comprising:
acquiring at least one optical path candidate for minimizing cost of the optical network by solving
an objective function incorporating cost of optical path candidates by bandwidth, the optical path candidate being a candidate for an optical path composing a demand, and
a mathematical programming problem employing a constraint condition incorporating a bandwidth of an optical path pattern candidate connecting the start-point node and the end-point node of the demand and a bandwidth of the at least one acquired optical path candidate, the optical path pattern candidate being the acquired optical path candidate itself or being obtained by combining the optical path candidates; and
allocating the demand to the at least one acquired optical path candidate for minimizing the cost to accommodate the demand.

13. The demand accommodation design method as claimed in claim 12, further comprising:
extracting the optical path pattern candidate connecting the start-point node and the end-point node of the demand by combining the optical path candidates, the optical path candidate being a candidate for an optical path composing a demand.

14. The demand accommodation design method as claimed in claim 13, wherein
the objective function utilized in the analytical unit minimizes a sum of products of a cost of the optical path candidates by bandwidth and a number of the optical path candidates for a corresponding bandwidth.

15. The demand accommodation design method as claimed in claim 14, wherein
the constraint condition includes a condition in which a total number of the optical path pattern candidates selected for the demand is equal to a total number of demands.

16. The demand accommodation design method as claimed in claim 15, wherein
the constraint condition further includes a condition in which a total amount of bandwidth of the optical path pattern candidate that passes through the optical path candidates is less than or equal to a sum of products of a number of optical paths by bandwidth and a bandwidth of the corresponding optical path.

17. The demand accommodation design method as claimed in claim 16, wherein
the constraint condition further includes a condition in which a number of the optical path candidates is less than or equal to a limiting value for limiting a number of wavelengths for each link.

18. The demand accommodation design system as claimed in claim 13, further comprising:
extracting a signal transmission route from the start-point node to the end-point node of the demand as the optical path candidate.

19. The demand accommodation design method as claimed in claim 18, further comprising:
extracting, as the optical path candidate, a route connecting a hub site and one of the start-point node and the end-point node, or a route connecting hub sites, the hub site being a node having three or more links on the signal transmission route of the demand.

20. The demand accommodation design method as claimed in claim 19, further comprising:
extracting, as the optical path candidate, a route connecting the hub sites, one of the hub sites being located closest to the start-point node and the other being located closest to the end-point node.

* * * * *